(12) United States Patent
Arakawa (10) Patent No.: US 12,429,581 B2
(45) Date of Patent: Sep. 30, 2025

(54) RADAR DEVICE, AND VEHICLE AND POSITION DETECTION DEVICE INCLUDING THE SAME

(71) Applicant: Murata Manufacturing Co., Ltd., Nagaokakyo (JP)

(72) Inventor: Nobuya Arakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 514 days.

(21) Appl. No.: 17/959,313

(22) Filed: Oct. 4, 2022

(65) Prior Publication Data

US 2023/0036918 A1   Feb. 2, 2023

Related U.S. Application Data

(63) Continuation of application No. PCT/JP2021/006859, filed on Feb. 24, 2021.

(30) Foreign Application Priority Data

Apr. 6, 2020 (JP) .................................. 2020-068632

(51) Int. Cl.
*G01S 13/931* (2020.01)
*G01S 13/42* (2006.01)

(52) U.S. Cl.
CPC ............ *G01S 13/931* (2013.01); *G01S 13/42* (2013.01)

(58) Field of Classification Search
None
See application file for complete search history.

(56) References Cited

U.S. PATENT DOCUMENTS 9,964,631 B2 * 5/2018 Choi ...................... H01Q 21/08
2014/0368374 A1 * 12/2014 Choi ........................ G01S 13/42
342/175

(Continued)

FOREIGN PATENT DOCUMENTS

JP  2011-64584 A   3/2011
JP  2016-180720 A  10/2016

(Continued)

OTHER PUBLICATIONS

International Search Report and Written Opinion mailed on Apr. 13, 2021, received for PCT Application PCT/JP2021/006859, filed on Feb. 24, 2021, 9 pages including English Translation.

*Primary Examiner* — Marcus E Windrich
(74) *Attorney, Agent, or Firm* — XSENSUS LLP (57) ABSTRACT

Provided is a radar device that may perform an angle estimation of an incoming direction of an incoming wave with high accuracy because of increased angular resolution and has an increased dynamic range. In a transmission antenna Tx, transmission antenna elements Tx1, Tx2, Tx3, and the like of number m of three or more are arranged in a straight line at equal intervals of wavelength λ of a transmission wave. In a reception antenna Rx, reception antenna elements Rx1, Rx2, and the like, are arranged in a straight line at equal intervals. Circuitry generates virtual reception antenna elements Rxa, Rxb, . . . , and Rxq between the respective reception antenna elements by adjusting a phase of a reception signal to control the directivity of a radio wave to perform beam-forming between transmission antenna elements in each pair.

20 Claims, 6 Drawing Sheets

(56) References Cited

U.S. PATENT DOCUMENTS

| | | | |
|---|---|---|---|
| 2017/0307744 A1* | 10/2017 | Loesch | H01Q 21/296 |
| 2019/0293753 A1* | 9/2019 | Iwasa | G01S 7/2813 |
| 2019/0310346 A1* | 10/2019 | Lee | G01S 13/867 |
| 2020/0096626 A1 | 3/2020 | Wang et al. | |
| 2020/0103495 A1* | 4/2020 | Iwasa | G01S 7/4026 |
| 2020/0355816 A1* | 11/2020 | Ishikawa | G01S 7/354 |
| 2021/0239788 A1* | 8/2021 | Arage | G01S 7/032 |
| 2022/0163623 A1* | 5/2022 | Kishigami | G01S 13/288 |

FOREIGN PATENT DOCUMENTS

| | | |
|---|---|---|
| JP | 2018-54327 A | 4/2018 |
| JP | 2020-153871 A | 9/2020 |

\* cited by examiner

RADAR DEVICE, AND VEHICLE AND POSITION DETECTION DEVICE INCLUDING THE SAME

CROSS REFERENCE TO RELATED APPLICATIONS

The present application is a bypass continuation of PCT Application PCT/JP2021/00689, filed Feb. 24, 2021, which claims priority to Japanese patent application JP 2020-068632, filed Apr. 6, 2020, the entire contents of each of which being incorporated herein by reference.

TECHNICAL FIELD

The present disclosure relates to a radar device, and a vehicle and a position detection device each including the radar device.

BACKGROUND ART

Patent Document 1 discloses a MIMO (Multiple-Input Multiple-Output) radar device.

CITATION LIST

Patent Document

Patent Document 1: Japanese Unexamined Patent Application Publication No. 2018-54327

SUMMARY

Technical Problems

With a MIMO radar device in the related art, it is possible to configure a virtual reception array antenna equal to the product of the number of transmission antenna elements and the number of reception antenna elements at the maximum number, by contriving the arrangement of the antenna elements in the transmission and reception array antenna. However, in the radar device in the related art described above, adjacent transmission sub-arrays share a transmission antenna element, and a plurality of transmission antenna elements, which constitutes one transmission sub-array, performs beam-forming (also described as a noun "beam-forming") to transmit one beam signal. With this, the number of transmission antenna elements substantially decreases relative to the total number of transmission antenna elements constituting the two adjacent transmission sub-arrays. The number of virtual reception antenna elements constituting the virtual reception array antenna is determined by the product of the number of transmission antenna elements and the number of reception antenna elements, and therefore, decreases with the decrease in the number of transmission antenna elements.

It is known that angular resolution of a method for estimating an incoming direction of an incoming wave depends on the number of reception antenna elements. Accordingly, when the number of virtual reception antenna elements constituting a virtual reception array antenna decreases as in the radar device described in Patent Document 1, the angular resolution of the radar device decreases.

Solutions to Problems

The present disclosure has been made to solve the problem described above as follows, as well as other problems as are known. A radar device is configured to include: a transmission antenna including three or more transmission antenna elements arranged in a straight line at equal intervals of a wavelength of a transmission wave; a reception antenna including an integer multiple of two reception antenna elements arranged in a straight line at equal intervals separated by a distance obtained by multiplying a value determined by subtracting three from twice a number of the transmission antenna elements and a value of half the wavelength; and circuitry configured to generate virtual reception antenna elements between the reception antenna elements by adjusting a phase of a transmission signal or a reception signal to control directivity of a radio wave to perform beam-forming between the transmission antenna elements in each pair.

According to an embodiment, by performing beam-forming between the transmission antenna elements in each pair, a virtual transmission antenna element is formed at a center of the transmission antenna elements in each pair. The virtual transmission antenna elements are formed in a straight line at equal intervals separated by a distance of $\lambda/2$, which is half the wavelength $\lambda$ of the transmission wave. The number of the virtual transmission antenna elements is the same as the number of the transmission antenna elements when the number of the transmission antenna elements is three, and the number of virtual transmission antenna elements increases by two each time the number of transmission antenna elements increases by one when the number of transmission antenna elements is four or more. Then, between the reception antenna elements, virtual reception antenna arrays are formed in a straight line at equal intervals separated by the distance $\lambda/2$, which is half the wavelength $\lambda$ of the transmission wave. The number of elements of the virtual reception antenna arrays is equal to the product of the number of virtual transmission antenna elements and the number of reception antenna elements. Accordingly, it is possible to obtain a virtual reception antenna array constituted of the virtual reception antenna elements of the number equal to or greater than that in a MIMO radar device in the related art, which uses a transmission antenna element as a single antenna, by performing the beam-forming to increase an antenna gain in a main beam direction to narrow a beam width, without decreasing the number of virtual reception antenna elements as in the radar device in the related art described in Patent Document 1.

With this, the angular resolution of the radar device is increased more than that of a MIMO radar device in the related art, and the angle estimation of an incoming direction of an incoming wave may be performed with higher accuracy than that of a MIMO radar device in the related art. Further, the increase of the angular resolution of the radar device improves the target identification capability, and performing the beam-forming enables detection of a reflected wave from a target having low radio wave reflectance, and the dynamic range of the radar device thus increases.

Further, a vehicle including the radar device described above is configured.

According to an embodiment, it is possible to provide a vehicle capable of estimating the position of an obstacle around the vehicle with high accuracy, with the use of the radar device with the increased angular resolution and dynamic range.

Further, in an embodiment, a position detection device is configured to detect a target position by performing beam-forming on the radio wave emitted from the transmission antenna of the radar device described above to scan in all directions, and by detecting a direction in which intensity of the reception signal received by the reception antenna increases.

According to an embodiment, it is possible to provide a position detection device capable of estimating the target position with high accuracy with the use of the radar device with the increased angular resolution and dynamic range.

Advantageous Effects

According an embodiment, it is possible to provide a radar device described as follows, and a vehicle and a position detection device each including the radar device. The radar device may obtain a virtual reception antenna array constituted of virtual reception antenna elements, of which the number is equal to or greater than that of a MIMO radar device in the related art, may perform an angle estimation of an incoming direction of an incoming wave with high accuracy because of increased angular resolution, and has an increased dynamic range.

DESCRIPTION OF EMBODIMENTS

Next, embodiments of a radar device, and a vehicle and a position detection device each including the radar device will be described.

Figure 1:
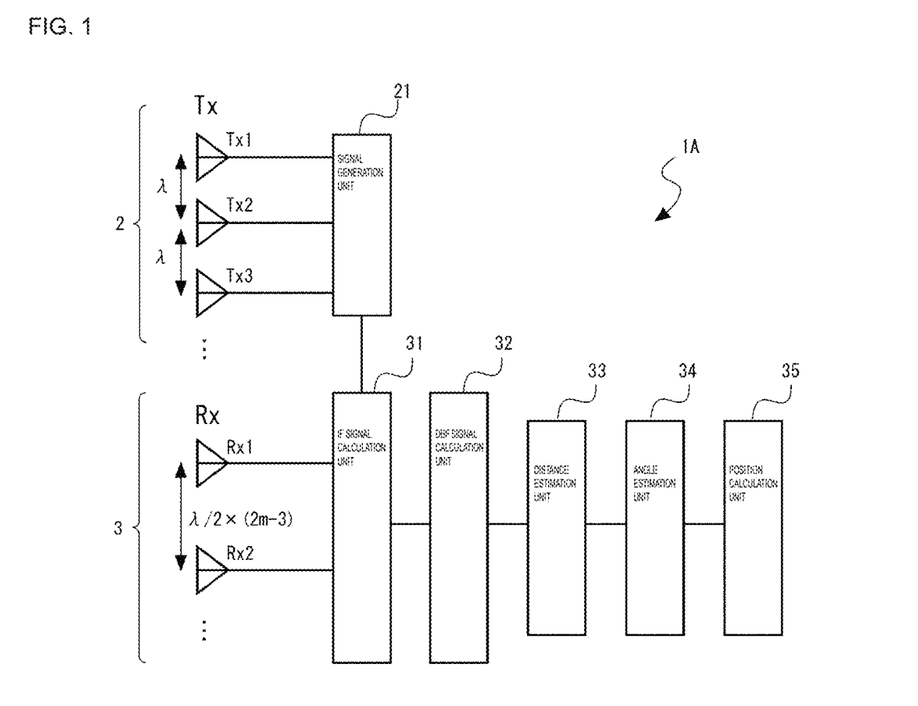
FIG. 1 is a block diagram illustrating a schematic configuration of a radar device according to a first embodiment.

FIG. 1 is a block diagram illustrating a schematic configuration of an FMCW (Frequency-Modulated Continuous-Wave) radar device 1A according to a first embodiment.

The radar device 1A includes a transmitter 2 and a receiver 3. The transmitter 2 includes a signal generation unit 21 and a transmission antenna Tx. The receiver 3 includes a reception antenna Rx, an IF (Intermediate Frequency) signal calculation unit 31 (also referred to as IF signal calculation circuitry), a DBF signal calculation unit 32 (also referred to as DFB signal calculation circuitry), a distance estimation unit 33 (also referred to as distance estimation circuitry), an angle estimation unit (also referred to as angle estimate circuitry), and a position calculation unit 35 (also referred to as position calculation circuitry). Moreover, the calculation and estimation circuitry described above may be implemented in a programmed computer/processor/controller and/or dedicated circuitry (e.g., an ASIC or the like that configured to perform the function).

The signal generation unit 21 generates a chirp signal as a transmission signal. The transmission signal is converted into a high frequency radio wave such as a millimeter wave and is emitted from the transmission antenna Tx. In the present embodiment, the transmission antenna Tx is constituted of m transmission antenna elements Tx1, Tx2, Tx3, and the like, where m is three or more (m≥3). The reception antenna Rx receives a reflected wave, which is the wave emitted from the transmission antenna Tx and reflected by a target (target object). In the present embodiment, the reception antenna Rx is constituted of 2n reception antenna elements Rx1, Rx2, and the like, where 2n is an integer multiple of 2 (n is a natural number).

The signal generation unit 21 causes transmission signals to be emitted in time division from each of the transmission antenna elements Tx1, Tx2, Tx3, and the like. The IF signal calculation unit 31 mixes the reception signal, which is emitted from one of the transmission antenna elements Tx1, Tx2, Tx3, and the like and received by each of the reception antenna elements Rx1, Rx2, and the like, with the transmission signal emitted at that time. Thus, the IF signal calculation unit 31 calculates an IF signal between a high frequency and a baseband frequency. The DBF (Digital Beam-Forming) signal calculation unit 32 converts each IF signal calculated by the IF signal calculation unit 31 into a digital signal by an AD converter. Then, a combination in a pair of IF signals converted into digital signals is changed to a combination of received signals from transmission antenna elements in each pair, and digital beam-forming is performed to control directivity of a radio wave to obtain a DBF signal. The calculation of the DBF signal by the digital beam-forming is performed by the number of elements of a virtual reception antenna array to be described later, and the phase of the reception signal is controlled by the DBF signal calculation unit 32.

The distance estimation unit 33 performs a FFT (Fast Fourier Transform) on the DBF signal calculated by the DBF signal calculation unit 32 to estimate the distance to a target (target object). The angle estimation unit 34 estimates the angle at which the target is present using an incoming direction estimation method of a reflected wave such as an FFT or a MUSIC (Multiple Signal Classification) method, based on the DBF signal calculated by the DBF signal calculation unit 32. The position calculation unit 35 calculates the estimated target position, based on the distance to the target estimated by the distance estimation unit 33 and the angle, at which the target is present, estimated by the angle estimation unit 34.

Figure 2:
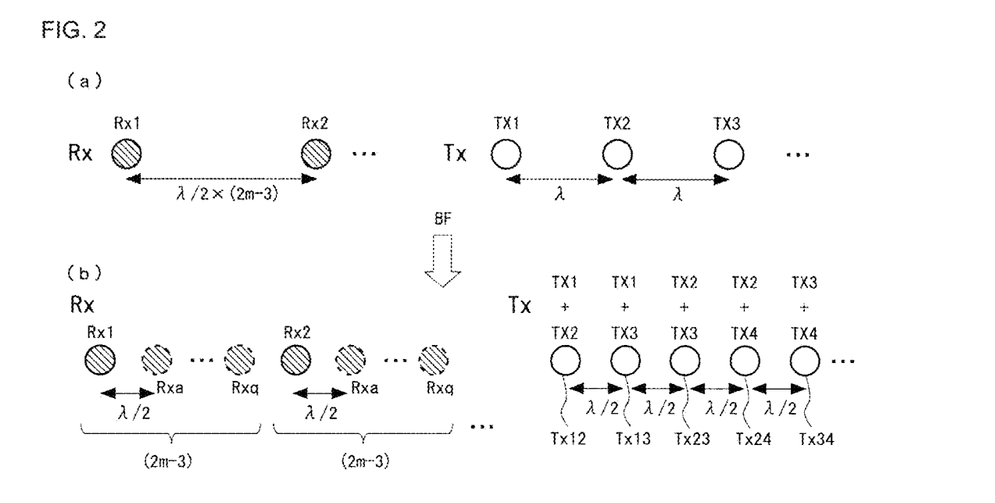
FIG. 2 is a diagram for explaining a typical process in which a virtual transmission antenna element and a virtual reception antenna element are formed by radar devices according to the first and second embodiments.

FIG. 2(a) is a diagram for explaining an arrangement of the transmission antenna Tx and the reception antenna Rx in the radar device 1A of the present embodiment.

In the present embodiment, the transmission antenna Tx includes m, which is three or more, of the transmission antenna elements Tx1, Tx2, Tx3, and the like arranged in a straight line at equal intervals of one wavelength λ of a transmission wave. Further, the reception antenna Rx includes the reception antenna elements Rx1, Rx2, and the like being arranged in a straight line at equal intervals separated by a distance of λ/2×(2m−3). The distance of λ/2×(2m−3) is obtained by multiplying a value (2m−3), which is twice the number m of the transmission antenna elements Tx1, Tx2, Tx3, and the like minus three, and λ/2 of half the wavelength λ of the transmission wave.

The DBF signal calculation unit 32 and the angle estimation unit 34 constitute a control unit that generates virtual reception antenna elements Rxa, . . . , Rxq between the reception antenna elements Rx1, Rx2, and the like, as illustrated in FIG. 2(b), by adjusting the phases of the reception signals to control the directivity of a radio wave to perform beam-forming in each pair of the transmission antenna elements Tx1 and Tx2, Tx1 and Tx3, Tx2 and Tx3, Tx2 and Tx4, Tx3 and Tx4, and the like. In the present embodiment, the DBF signal calculation unit 32 generates virtual reception antenna elements Rxa, . . . , Rxq between the reception antenna elements Rx1, Rx2, and the like: by converting each reception signal emitted in time division from each of the transmission antenna elements Tx1, Tx2, Tx3, and the like, and received by the reception antenna elements Rx1, Rx2, and the like into a digital signal; and by changing a combination of the converted reception signals in a pair into a combination of signals received from each of the pairs of transmission antenna elements Tx1 and Tx2, Tx1 and Tx3, Tx2 and Tx3, Tx2 and Tx4, Tx3 and Tx4, and the like, to perform digital beam-forming to control the directivity of a radio wave, and to control the phase of the reception signal. The angle estimation unit 34 recognizes the array arrangement of the virtual reception antenna elements Rxa, . . . , Rxq, and estimates the angle at which a target is present.

That is, the DBF signal calculation unit 32 performs digital beam-forming in a pair of a transmission antenna element Tx (k) and a transmission antenna element Tx (k+1), and in a pair of the transmission antenna element Tx (k) and a transmission antenna element Tx (k+2), when a k-th transmission antenna element is represented by Tx (k) (k=1, 2, . . . , m−1). As described above, by performing the digital beam-forming in the pair of transmission antenna elements Tx (k) and Tx (k+1), and in the pair of transmission antenna elements Tx (k) and Tx (k+2), virtual transmission antenna elements are formed at a center between the transmission antenna elements Tx1, Tx2, Tx3, and the like.

That is, as in the virtual transmission antenna array illustrated in FIG. 2(b), virtual transmission antenna elements Tx12, Tx13, Tx23, Tx24, Tx34, and the like are formed in a straight line at equal intervals separated by a distance λ/2, which is half the wavelength λ of the transmission wave. The virtual transmission antenna element Tx12 is in a phase center at a center of a pair of the transmission antenna elements Tx1 and Tx2, the virtual transmission antenna element Tx13 is in a phase center at a center of a pair of the transmission antenna elements Tx1 and Tx3, the virtual transmission antenna element Tx23 is in a phase center at a center of a pair of the transmission antenna elements Tx2 and Tx3, the virtual transmission antenna element Tx24 is in a phase center at a center of a pair of the transmission antenna elements Tx2 and Tx4, the virtual transmission antenna element Tx34 is in a phase center at a center of a pair of the transmission antenna elements Tx3 and Tx4, and the like.

Figure 3:
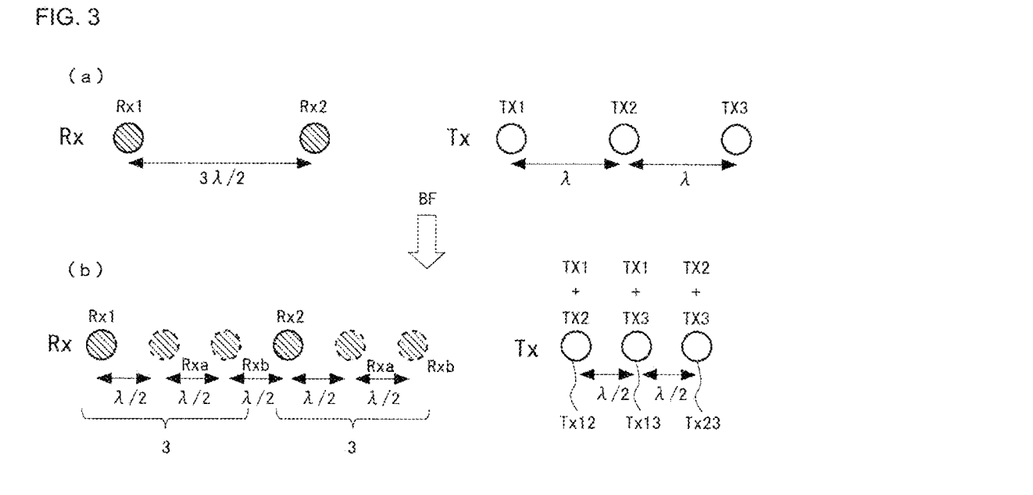
FIG. 3 is a diagram for explaining a process in which a virtual transmission antenna element and a virtual reception antenna element are formed from three transmission antenna elements and two reception antenna elements by the radar devices according to the first and second embodiments.

As illustrated in FIG. 3(a), when the transmission antenna Tx is constituted of the three transmission antenna elements of Tx1, Tx2 and Tx3 (the number of Tx=3) and the reception antenna Rx is constituted of the two reception antenna elements of Rx1 and Rx2 (the number of Rx=2n=2), by performing digital beam-forming in each pair of the transmission antenna elements Tx1 and Tx2, Tx1 and Tx3, and Tx2 and Tx3, as illustrated in FIG. 3(b), virtual transmission antenna elements Tx12, Tx13, and Tx23 are formed in a straight line at equal intervals separated by the distance of λ/2, which is half the wavelength λ of the transmission wave. The virtual transmission antenna element Tx12 is in a phase center at a center of a pair of the transmission antenna elements Tx1 and Tx2, the virtual transmission antenna element Tx13 is in a phase center at a center of a pair of the transmission antenna elements Tx1 and Tx3, and the virtual transmission antenna element Tx23 is in a phase center at a center of a pair of the transmission antenna elements Tx2 and Tx3.

In the case above, assuming that the direction of a target is θ, phase differences between the transmission antenna elements Tx1, Tx2, and Tx3 are w, and the gains of the transmission antenna elements are the same, that is in an ideal state, reception signals x1, x2, and x3 received by a certain reception antenna element Rxp are represented by the following Equation (1), Equation (2), and Equation (3) for each of the transmission antenna elements Tx1, Tx2, and Tx3 that transmitted a signal at that time.

[Formula 1]

$$x_1 = Ae^{j\alpha} \quad (1)$$

$$x_2 = Ae^{j(\alpha+w)} \quad (2)$$

$$x_3 = Ae^{j(\alpha+2w)} \quad (3)$$

In the equations above, A is the amplitude of the reception signals x1, x2, and x3, α is the phase of the reception signal x1 transmitted from the transmission antenna element Tx1, and the reception signal x1 is represented by Equation (1) using the amplitude A and the phase α. The reception signal x2 is the signal transmitted from the transmission antenna element Tx2 having the phase difference w with the transmission antenna element Tx1, and therefore, the phase of the reception signal x2 is α+w. Further, the reception signal x3 is the signal transmitted from the transmission antenna element Tx3 having phase differences 2w with the transmission antenna element Tx1, and therefore, the phase of the reception signal x3 is α+2w.

On each of the reception signals x1, x2, and x3, performing the digital beam-forming in a pair of the transmission antenna elements Tx1 and Tx2 yields the virtual transmission antenna element Tx12 represented by the following Equation (4), performing the digital beam-forming in a pair of the transmission antenna elements Tx1 and Tx3 yields the virtual transmission antenna element Tx13 represented by the following Equation (5), and performing the digital beam-forming in a pair of the transmission antenna elements Tx2 and Tx3 yields the virtual transmission antenna element Tx23 represented by the following Equation (6).

[Formula 2]

$$x_1 + e^{j\Delta\varphi}x_2 = Ae^{j\alpha}\left(1 + e^{j(\Delta\varphi+w)}\right) = A'e^{j(\alpha+\frac{1}{2}\Delta\varphi+\frac{1}{2}\underline{w})} \quad (4)$$

$$x_1 + e^{j\Delta\varphi}x_3 = Ae^{j\alpha}\left(1 + e^{j(\Delta\varphi+2w)}\right) = A'e^{j(\alpha+\frac{1}{2}\Delta\varphi+\underline{w})} \quad (5)$$

$$x_2 + e^{j\Delta\varphi}x_3 = Ae^{j(\alpha+w)}\left(1 + e^{j(\Delta\varphi+w)}\right) = A'e^{j(\alpha+\frac{1}{2}\Delta\varphi+\frac{3}{2}\underline{w})} \quad (6)$$

In each of the equations above, $\Delta\varphi$ is a phase difference set between any two transmission antenna elements. By adjusting the phase difference $\Delta\varphi$, the direction of the beam emitted from the transmitter 2 may be varied. Adjusting or controlling the phase of a transmission signal or a reception signal in beam-forming refers to setting the phase difference $\Delta\varphi$ to any value. Further, A' in each of the equations above represents the amplitude of the reception signal obtained by adding any two reception signals having the amplitude A.

The transmission signal in the virtual transmission antenna element Tx12 represented by Equation (4) is obtained by adding the reception signal x1 represented by Equation (1) and the reception signal x2 represented by Equation (2), and Equation (4) is modified to exhibit a phase difference w/2 as indicated by the rightmost exponent being underlined. Further, the transmission signal in the virtual transmission antenna element Tx13 represented by Equation (5) is obtained by adding the reception signal x1 represented by Equation (1) and the reception signal x3 represented by Equation (3), and Equation (5) is modified to exhibit a phase difference w as indicated by the rightmost exponent being underlined. Further, the transmission signal in the virtual transmission antenna element Tx23 represented by Equation (6) is obtained by adding the reception signal x2 represented by Equation (2) and the reception signal x3 represented by Equation (3), and Equation (6) is modified to exhibit a phase difference 3w/2 as indicated by the rightmost exponent being underlined.

Accordingly, the phase differences between the virtual transmission antenna elements Tx12, Tx13, and Tx23 are w/2. That is, the each of the reception signals x1, x2, and x3 may be regarded as a signal transmitted from each of the virtual transmission antenna elements Tx12, Tx13, and Tx23 with intervals of $\lambda/2$ as illustrated in FIG. 3(b). With this, as illustrated in FIG. 3(b), the virtual reception antenna elements Rxa and Rxb are formed between the reception antenna elements Rx1 and Rx2, and virtual reception antenna arrays having six elements, which is the product of three virtual transmission antenna elements and two reception antenna elements, are formed in a straight line at equal intervals separated by the distance of $\lambda/2$, which is half the wavelength $\lambda$ of the transmission wave.

Figure 4:
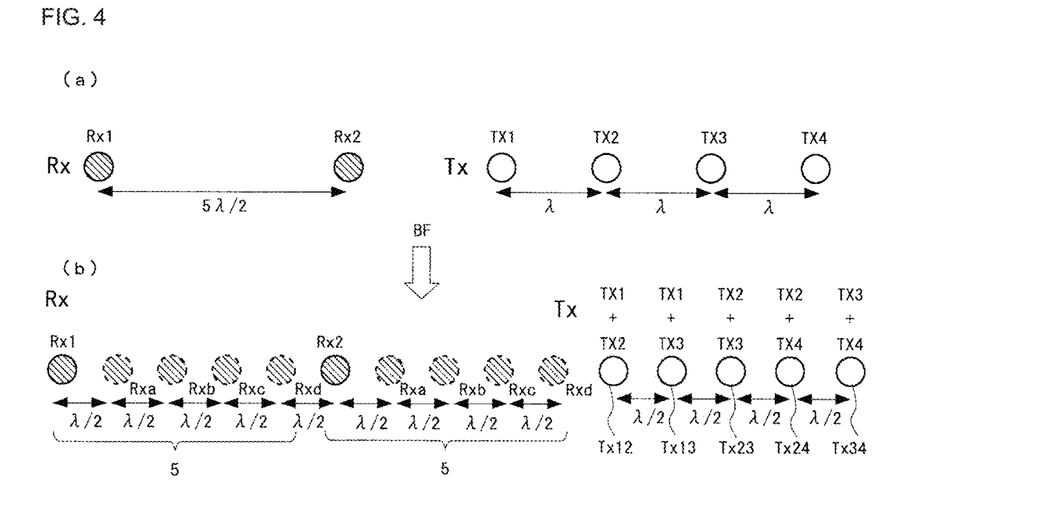
FIG. 4 is a diagram for explaining a process in which a virtual transmission antenna element and a virtual reception antenna element are formed from four transmission antenna elements and two reception antenna elements by the radar devices according to the first and second embodiments.

Further, as illustrated in FIG. 4(a), when the transmission antenna Tx is constituted of the four transmission antenna elements Tx1, Tx2, Tx3, and Tx4 (the number of Tx=4), and the reception antenna Rx is constituted of the two reception antenna elements Rx1 and Rx2 (the number of Rx=2n=2), digital beam-forming is performed in each pair of the transmission antenna elements Tx1 and Tx2, Tx1 and Tx3, Tx2 and Tx3, Tx2 and Tx4, and Tx3 and Tx4 to form virtual transmission antenna elements Tx12, Tx13, Tx23, Tx24, and Tx34 illustrated in FIG. 4(b).

That is, the virtual transmission antenna elements Tx12, Tx13, Tx23, Tx24, Tx34 are formed in a straight line at equal intervals separated by the distance $\lambda/2$, which is half the wavelength $\lambda$ of the transmission wave. The virtual transmission antenna element Tx12 is in a phase center at a center of a pair of the transmission antenna elements Tx1 and Tx2, the virtual transmission antenna element Tx13 is in a phase center at a center of a pair of the transmission antenna elements Tx1 and Tx3, the virtual transmission antenna element Tx23 is in a phase center at a center of a pair of the transmission antenna elements Tx2 and Tx3, the virtual transmission antenna element Tx24 is in a phase center at a center of a pair of the transmission antenna elements Tx2 and Tx4, and the virtual transmission antenna element Tx34 is in a phase center at a center of a pair of the transmission antenna elements Tx3 and Tx4.

The phase difference between the virtual transmission antenna elements Tx12, Tx13, Tx23, Tx24, and Tx34 is w/2 as in the case that the number of transmission antenna elements Tx is three and the number of reception antenna elements Rx is two. With this, between the reception antenna elements Rx1 and Rx2, as illustrated in FIG. 4(b), virtual reception antenna arrays of 10 elements, which is the product of five virtual transmission antenna elements and two reception antenna elements, are formed in a straight line at equal intervals separated by the distance of $\lambda/2$, which is half the wavelength $\lambda$ of the transmission wave.

That is, with the use of the radar device 1A of the present embodiment, when m of transmission antenna elements corresponds to the three transmission antenna elements Tx1, Tx2, and Tx3 as illustrated in FIG. 3(a), the same number of three virtual transmission antenna elements Tx12, Tx13, and Tx23 are formed as illustrated in FIG. 3(b). Then, between the reception antenna elements Rx1 and Rx2, virtual reception antenna arrays of six of the elements, which is the product of three of the virtual transmission antenna elements and two of the reception antenna elements, are formed in a straight line at equal intervals separated by the distance $\lambda/2$, which is half the wavelength $\lambda$ of the transmission wave, as illustrated in FIG. 3(b).

Further, when m transmission antenna elements corresponds to four or more, virtual transmission antenna elements are formed in the number that increases by two each time m of the transmission antenna elements increases by one. Then, between the reception antenna elements, virtual reception antenna arrays are formed in a straight line at equal intervals separated by the distance $\lambda/2$, which is half the wavelength $\lambda$ of the transmission wave. The number of elements of the virtual reception antenna arrays is equal to the product of the number of virtual transmission antenna elements and the number of reception antenna elements.

For example, as illustrated in FIG. 4(a), when m transmission antenna elements corresponds to four increased by one from three to be transmission antenna elements Tx1, Tx2, Tx3, and Tx4, the five virtual transmission antenna elements Tx12, Tx13, Tx23, Tx24, and Tx34 increased by two from three are formed as illustrated in FIG. 4(b). Then, virtual reception antenna elements Rxa, Rxb, Rxc, and Rxd are formed between the reception antenna elements Rx1 and Rx2, as illustrated in FIG. 4(b), and virtual reception antenna arrays of ten elements, which is the product of five virtual transmission antenna elements and two reception antenna elements, are formed in a straight line at equal intervals separated by the distance $\lambda/2$, which is half the wavelength $\lambda$ of the transmission wave.

Accordingly, with the use of the radar device 1A of the present embodiment, it is possible to obtain a virtual reception antenna array constituted of the virtual reception antenna elements of the number equal to or greater than that in a MIMO radar device in the related art, which uses a transmission antenna element as a single antenna by performing the beam-forming to increase the antenna gain in the main beam direction to narrow the beam width, without decreasing the number of virtual reception antenna elements as in the radar device in the related art described in Patent Document 1. With this, the angular resolution of the radar device 1A is increased more than that of a MIMO radar device in the related art, and the angle estimation of an incoming direction of an incoming wave may be performed with higher accuracy than that of a MIMO radar device in the related art. Further, the increase of the angular resolution of the radar device 1A makes the target identification capability also improve, and performing the beam-forming enables detection of a reflected wave from a target having low radio wave reflectance, so that the dynamic range of the radar device 1A increases.

Further, with the use of the radar device 1A of the present embodiment, the phase of a reflected wave, transmitted in time division from each one of the transmission antenna elements Tx1, Tx2, Tx3, and the like and received by the each of the reception antenna elements Rx1 and Rx2, is controlled by the calculation to perform digital beam-forming. Thus, calculated is a reflected wave at the time when the beam, of which emission direction is controlled, is irradiated to a target. The target position is estimated from the calculated direction of the reflected wave. At this time, formed is the virtual reception antenna elements, of which the number is equal to or greater than that of a MIMO radar device in the related art, and therefore, the target position is estimated with high accuracy.

Further, with the use of the radar device 1A of the first embodiment that performs digital beam-forming, the number of times of transmission and reception of signals may be decreased in comparison with a radar device 1B of a second embodiment that performs analog beam-forming, which will be described later, and therefore, the time required for position estimation of a target is shortened.

Figure 5:
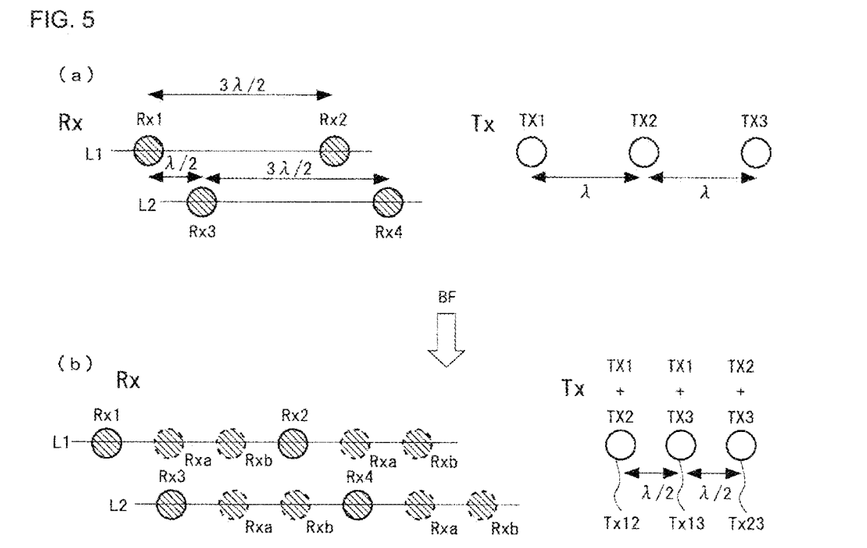
FIG. 5 is a diagram for explaining the estimation of a target position in a three-dimensional space, performed with the radar devices according to the first and second embodiments, by arranging reception antenna arrays on two parallel straight lines separated in a vertical direction.

FIG. 5(a) is a diagram illustrating a transmission antenna Tx and a reception antenna Rx used in a radar device 1A according to a first modification of the first embodiment. The radar device 1A according to the first modification is different from the radar device 1A of the first embodiment only in the configuration of the reception antenna Rx, and other configurations in the first modification are the same as those in the first embodiment.

In the radar device 1A according to the first modification, reception antenna elements Rx1, Rx2, and the like are arranged in a straight line L1 at equal intervals separated by the distance of $\lambda/2 \times (2m-3)$, and the same number of reception antenna elements as those arranged on the straight line L1 are also arranged in a straight line L2 at equal intervals separated by the distance of $\lambda/2 \times (2m-3)$. The straight line L2 is separated from the straight line L1 in the vertical direction, and is parallel to the straight line L1.

For example, as illustrated in FIG. 5(a), in the reception antenna Rx, the reception antenna elements Rx1 and Rx2 are arranged on the straight line L1 at equal intervals separated by the distance of $3\lambda/2$, and the reception antenna elements Rx3 and Rx4, of which the number is same as the number of Rx1 and Rx2, are also arranged on the straight line L2 at equal intervals separated by the distance of $3\lambda/2$. The straight line L2 is separated from the straight line L1 in the vertical direction and is parallel to the straight line L1.

According to the present configuration, the virtual reception antenna elements Rxa and Rxb are generated between the reception antenna elements Rx1 and Rx2 arranged in a straight line L1, and also the virtual reception antenna elements Rxa and Rxb are generated between the reception antenna elements Rx3 and Rx4 arranged in a straight line L2, as illustrated in FIG. 5(b), by converting each reception signal emitted in time division from each of transmission antenna elements Tx1, Tx2, and Tx3 and received by each of the reception antenna elements Rx1 and Rx2 into a digital signal, and by changing a combination in a pair of the converted reception signals into a combination received from each pair of the transmission antenna elements Tx1 and Tx2, Tx1 and Tx3, and Tx2 and Tx3, to perform digital beam-forming to control the directivity of a radio wave.

With the use of the above radar device 1A according to the first modification of the first embodiment, the reception antenna arrays on the straight lines L1 and L2 are positioned side by side in the vertical direction, and therefore, the distance information of a target in the vertical direction may be obtained, and a target position in a three-dimensional space may be estimated.

Figure 6:
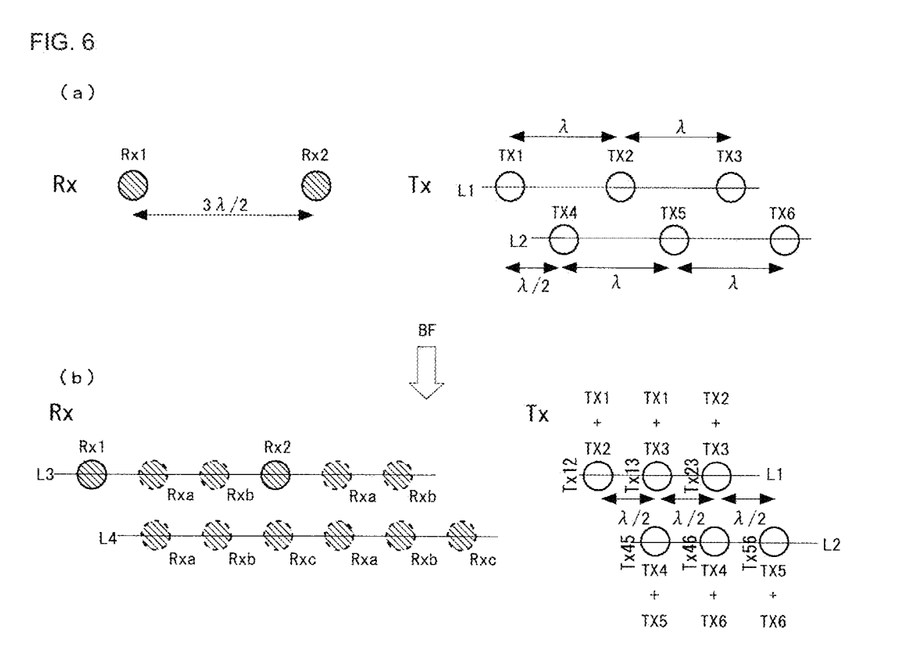
FIG. 6 is a diagram for explaining the estimation of a target position in a three-dimensional space, performed with the radar devices according to the first and second embodiments, by arranging transmission antenna arrays on two parallel straight lines separated in the vertical direction.

FIG. 6(a) is a diagram illustrating a transmission antenna Tx and a reception antenna Rx used in a radar device 1A according to a second modification of the first embodiment. The radar device 1A according to the second modification is different from the radar device 1A of the first embodiment only in the configuration of the transmission antenna Tx, and other configurations in the second modification are the same as those in the first embodiment.

In the radar device 1A according to the second modification, transmission antenna elements Tx1, Tx2, Tx3, and the like are arranged in a straight line L1 at equal intervals separated by the wavelength $\lambda$, and the same number of transmission antenna elements as those arranged on the straight line L1 are also arranged in a straight line L2 at equal intervals separated by the wavelength $\lambda$. The straight line L2 is separated from the straight line L1 in the vertical direction, and is parallel to the straight line L1.

For example, as illustrated in FIG. 6(a), in the transmission antenna Tx, the transmission antenna elements Tx1, Tx2, and Tx3 are arranged on the straight line L1 at equal intervals separated by the wavelength $\lambda$, and the transmission antenna elements Tx4, Tx5, and Tx6, of which the number is same as the number of Tx1, Tx2, and Tx3, are also arranged on the straight line L2 at equal intervals separated by the wavelength $\lambda$. The straight line L2 is separated from the straight line L1 in the vertical direction and is parallel to the straight line L1.

According to the present configuration, digital signals formed from transmission signals emitted by the virtual transmission antenna elements Tx12, Tx13, and Tx23 arranged on the straight line L1 illustrated in FIG. 6(b) are formed by converting each reception signal emitted in time division from each of the transmission antenna elements Tx1, Tx2, and Tx3 arranged on the straight line L1 and received by each of reception antenna elements Rx1 and Rx2 into a digital signal, and by changing a combination in a pair of the converted reception signals into a combination digital signal received from each pair of the transmission antenna elements Tx1 and Tx2, Tx1 and Tx3, and Tx2 and Tx3, to perform digital beam-forming to control the directivity of a radio wave.

Further, digital signals formed from transmission signals emitted by the virtual transmission antenna elements Tx45, Tx46, and Tx56 arranged in a straight line L2 illustrated in FIG. 6(b) are formed by converting each reception signal emitted in time division from each of the transmission antenna elements Tx4, Tx5, and Tx6 arranged on the straight line L2 and received by each of the reception antenna elements Rx1 and Rx2 into a digital signal, and by changing a combination in a pair of the converted reception signals into a combination digital signal received from each pair of the transmission antenna elements Tx4 and Tx5, Tx4 and Tx6, and Tx5 and Tx6, to perform digital beam-forming to control the directivity of a radio wave.

Accordingly, on the reception side, as illustrated in FIG. 6(b), virtual reception antenna elements Rxa and Rxb are generated between the reception antenna elements Rx1 and Rx2 arranged in a straight line L3, and virtual reception antenna arrays are formed on the straight line L3 at equal intervals separated by the distance $\lambda/2$, which is half the wavelength $\lambda$ of the transmission wave. The virtual reception antenna array is constituted of six of the elements, which is the product of three of the virtual transmission antenna elements Tx12, Tx13, and Tx23, and two of the reception antenna elements of Rx1 and Rx2. Further, in a straight line L4 vertically separated from the straight line L3 and parallel to the straight line L3, virtual reception antenna arrays are formed at equal intervals separated by the distance $\lambda/2$, which is half the wavelength $\lambda$ of the transmission wave. The virtual reception antenna array is constituted of two sets of virtual reception antenna elements Rxa, Rxb, and Rxc, and has six of the elements, which is the product of three of the virtual transmission antenna elements Tx45, Tx46, and Tx56, and two of the reception antenna elements Rx1 and Rx2.

With the use of the above radar device 1A according to the second modification of the first embodiment, corresponding to the virtual transmission antenna arrays on the straight lines L1 and L2 being positioned side by side in the vertical direction, the virtual reception antenna arrays are also positioned side by side in the vertical direction on the straight lines L3 and L4. Accordingly, also with the use of the second modification above, the distance information in the vertical direction of a target may be obtained, and a target position in a three-dimensional space may be estimated.

Further, a radar device 1A according to a third modification of the first embodiment is obtained with the configuration as follows. As illustrated in FIG. 5(a), the reception antenna elements are arranged on the straight line L1 at equal intervals, and reception antenna elements of the same number as the reception antenna elements arranged on the straight line L1 are arranged at equal intervals on the straight line L2, which is separated in the vertical direction from and parallel to the straight line L1. As well, as illustrated in FIG. 6(a), the transmission antenna elements are arranged on the straight line L1 at equal intervals, and transmission antenna elements of the same number as the transmission antenna elements arranged on the straight line L1 are arranged at equal intervals on the straight line L2, which is separated in the vertical direction from and is parallel to the straight line L1. Also with the use of the radar device 1A according to the third modification of the first embodiment, the virtual reception antenna arrays are positioned side by side in the vertical direction on a plurality of straight lines. Accordingly, also with the use of the third modification above, the distance information in the vertical direction of a target may be obtained, and a target position in a three-dimensional space may be estimated.

Figure 7:
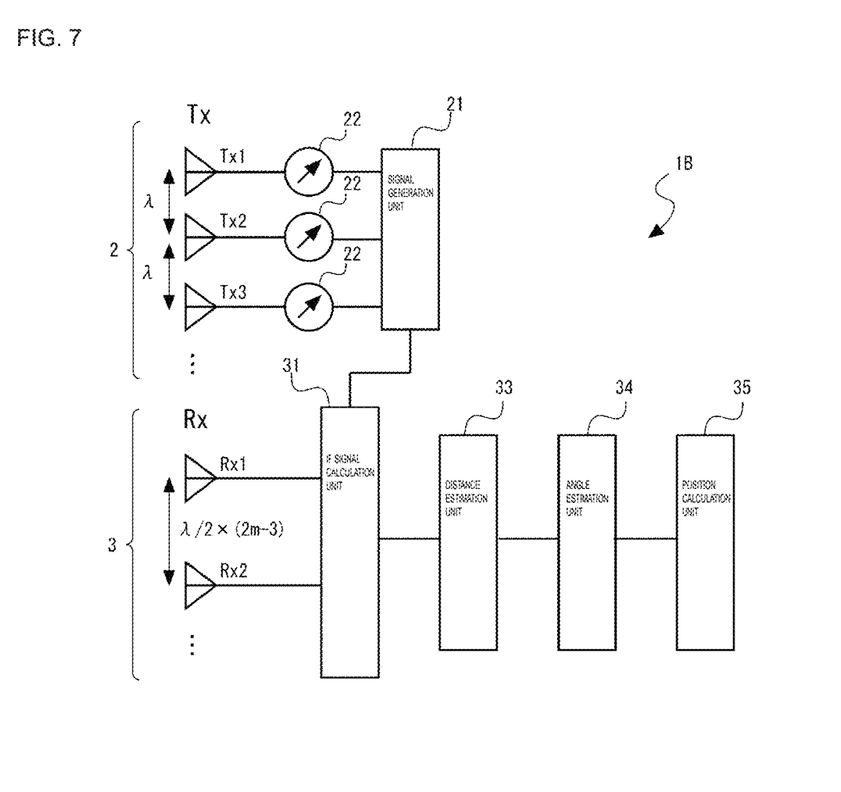
FIG. 7 is a block diagram illustrating a schematic configuration of the radar device according to the second embodiment.

FIG. 7 is a block diagram illustrating a schematic configuration of an FMCW radar device 1B according to a second embodiment. Note that, in FIG. 7, the same or corresponding components as those in FIG. 1 are denoted by the same reference signs, and a description thereof will be omitted.

The radar device 1B also includes a transmitter 2 and a receiver 3, but the transmitter 2 includes a phase shifter 22 in addition to a signal generation unit 21. The receiver 3 does not include a DBF signal calculation unit 32. The radar device 1B is different from the radar device 1A according to the first embodiment only in that analog beam-forming instead of digital beam-forming is performed.

A chirp signal generated by the signal generation unit 21 is controlled in its phase by the phase shifter 22 under the control of the signal generation unit 21 and is emitted as a transmission signal from a transmission antenna Tx. The reception antenna Rx receives a reflected wave that is emitted from the transmission antenna Tx and reflected by a target. The IF signal calculation unit 31 mixes the reception signal received by a reception antenna Rx and the transmission signal generated by the signal generation unit 21 to calculate an IF signal.

The signal generation unit 21 and the angle estimation unit 34 constitute a control unit that controls the directivity of a radio wave by adjusting the phases of the transmission signals with the phase shifters 22 to perform analog beam-forming in each pair of transmission antenna elements Tx1 and Tx2, Tx1 and Tx3, Tx2 and Tx3, Tx2 and Tx4, Tx3 and Tx4, and the like, and then, generates virtual reception antenna elements Rxa, Rxb, . . . , and Rxq between reception antenna elements Rx1, Rx2, and the like. That is, the signal generation unit 21, as the DBF signal calculation unit 32, performs beam-forming in a pair of a transmission antenna element Tx (k) and a transmission antenna element Tx (k+1), and in a pair of the transmission antenna element Tx (k) and a transmission antenna element Tx (k+2), when the k-th transmission antenna element is represented by Tx (k) (k=1, 2, . . . , m−1).

The distance estimation unit 33 performs FFT on the IF signal calculated by the IF signal calculation unit 31 to estimate a distance to a target. The angle estimation unit 34 estimates an angle at which a target is present using a reflected wave incoming direction estimation technique, such as FFT or a MUSIC method, based on the IF signal calculated by the IF signal calculation unit 31. At this time, the angle estimation unit 34 recognizes the array arrangement of virtual reception antenna elements Rxa, . . . , Rxq, and estimates the angle at which the target is present. The position calculation unit 35 calculates the estimated target position based on the distance to the target estimated by the distance estimation unit 33 and the angle, at which the target is present, estimated by the angle estimation unit 34.

Also with the use of the radar device 1B according to the second embodiment, performing analog beam-forming in a pair of transmission antenna elements Tx (k) and Tx (k+1), and in a pair of transmission antenna elements Tx (k) and Tx (k+2) causes virtual transmission antenna elements to be formed at a center in each pair of the transmission antenna elements Tx1, Tx2, Tx3, and the like. That is, as in the virtual transmission antenna Tx illustrated in FIG. 2(b), virtual transmission antenna elements Tx12, Tx13, Tx23, Tx24, Tx34, and the like are formed in a straight line at equal intervals separated by the distance $\lambda/2$, which is half the wavelength $\lambda$ of the transmission wave. The virtual transmission antenna element Tx12 is in a phase center at a center of a pair of the transmission antenna elements Tx1 and Tx2, the virtual transmission antenna element Tx13 is in a phase center at a center of a pair of the transmission antenna elements Tx1 and Tx3, the virtual transmission antenna element Tx23 is in a phase center at a center of a pair of the transmission antenna elements Tx2 and Tx3, the virtual transmission antenna element Tx24 is in a phase center at a center of a pair of the transmission antenna elements Tx2 and Tx4, the virtual transmission antenna element Tx34 is in a phase center at a center of a pair of the transmission antenna elements Tx3 and Tx4, and the like.

Accordingly, also with the use of the radar device 1B according to the second embodiment, it is possible to obtain a virtual reception antenna array constituted of the virtual reception antenna elements of the number equal to or greater than that in a MIMO radar device in the related art by performing the beam-forming to increase the antenna gain in the main beam direction to narrow the beam width. With this, the angular resolution in the radar device 1B is also increased more than that of a MIMO radar device in the related art, and the angle estimation of an incoming direction of an incoming wave may be performed with higher accuracy than that of a MIMO radar device in the related art. Further, the increase of the angular resolution of the radar device 1B also improves the target identification capability, and performing the beam-forming enables detection of a reflected wave from a target having low radio wave reflectance, so that the dynamic range of the radar device 1B increases.

Further, with the use of the radar device 1B of the second embodiment, the phase of a beam emitted from each pair of the transmission antenna elements is controlled to perform analog beam-forming, and the beam, of which emission direction is controlled, is irradiated to a target. The target position is estimated with high accuracy from a direction of a reflected wave received by the virtual reception antenna elements of which the number is equal to or greater than that of a MIMO radar device in the related art.

Further, also with the use of the radar device 1B according to the second embodiment, either of the reception antenna Rx or the transmission antenna Tx may be disposed on two parallel straight lines separated from each other in the vertical direction as illustrated in FIG. 5 and FIG. 6, or both the reception antenna Rx and the transmission antenna Tx may be disposed on two parallel straight lines separated from each other in the vertical direction. Thus, the distance information in the vertical direction of a target may be obtained as in the radar device 1A according to the first, second, and third modifications, and a target position in a three-dimensional space may be estimated.

Figure 8:
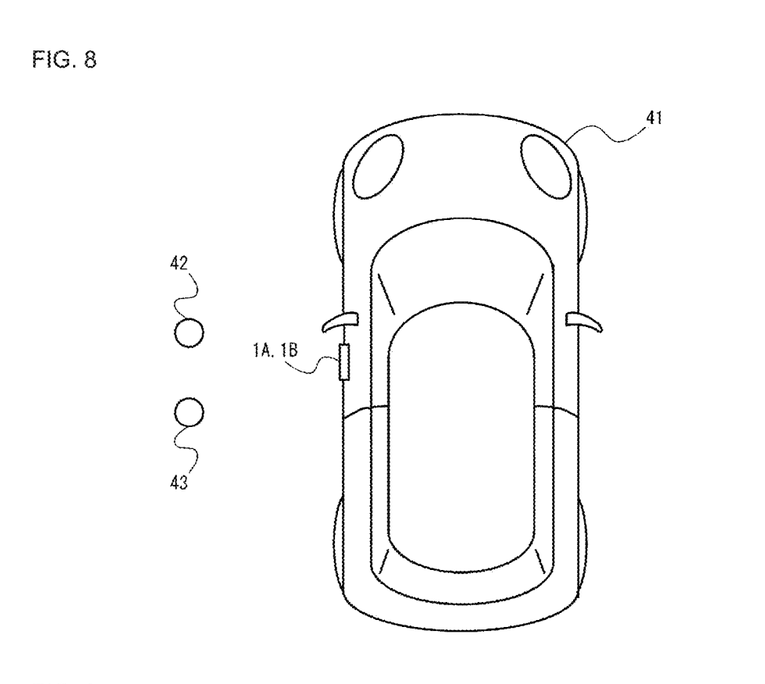
FIG. 8 is a plan view of a vehicle according to an embodiment.

FIG. 8 is a plan view of a vehicle 41 according to an embodiment in which the radar device 1A according to the first embodiment or the radar device 1B according to the second embodiment is included on a rocker panel below a door, or the like.

With the use of the vehicle 41 of the present configuration, the radar device 1A or 1B having increased angular resolution and dynamic range may accurately estimate the position of obstacles 42 and 43 around the vehicle 41, such as in a side of the vehicle 41, and may separately recognize the obstacles. Note that, although FIG. 8 illustrates an example of the detection of the obstacles 42 and 43 in the side of the vehicle 41, an obstacle in front of or behind the vehicle 41 may be detected with high accuracy as well.

Figure 9:
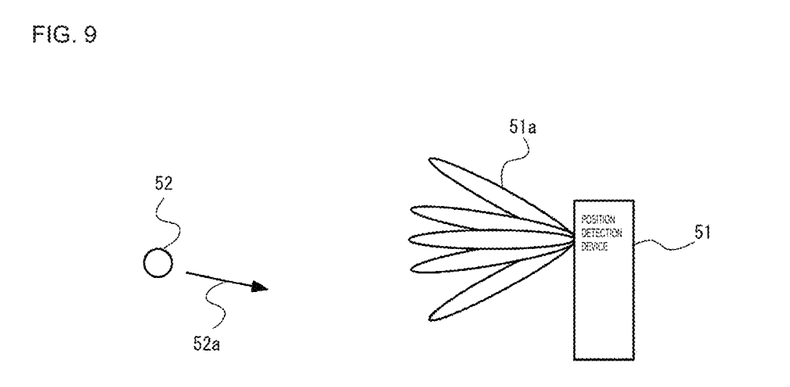
FIG. 9 is a diagram for explaining a position detection device according to an embodiment.

FIG. 9 is a diagram illustrating a position detection device 51 according to an embodiment, which is configured to include the radar device 1A according to the first embodiment or the radar device 1B according to the second embodiment.

The position detection device 51 detects the position of the target 52 by performing beam-forming on a beam 51a emitted from the transmission antenna Tx of the radar device 1A or 1B to scan in all directions, and by detecting a direction in which intensity of a reception signal of a reflected wave 52a from a target 52 received by the reception antenna Rx increases.

With the use of the position detection device 51 of the present configuration, it is possible to detect the target position with high accuracy by the radar device 1A or 1B having increased angular resolution and dynamic range.

Note that, in the radar devices 1A and 1B, the vehicle 41, and the position detection device 51 according to the embodiments described above, cases that the radar devices 1A and 1B are an FMCW radar have been described, but the radar devices 1A and 1B are not limited to an FMCW radar and may be radars that obtain angle information of a target from a phase difference between reflected waves.

The present disclosure, including various components as described above, may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Figure 10:
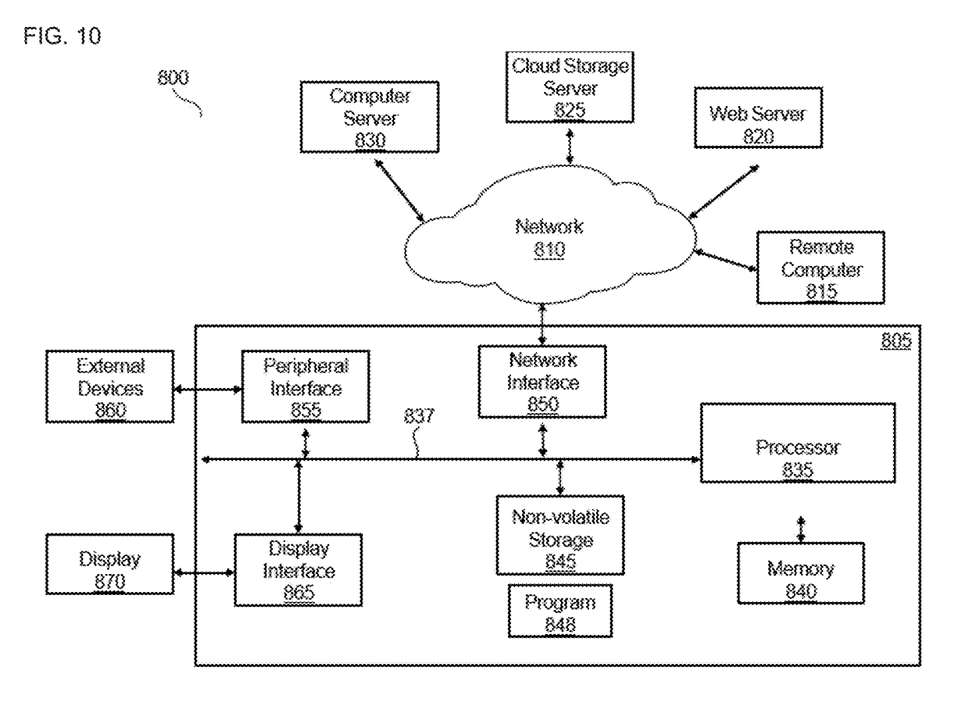
FIG. 10 is a block diagram of a computer that may be configured (by software and/or circuitry) to implement the various embodiments described herein.

FIG. 10 is a functional block diagram illustrating a networked system 800 of one or more networked computers and servers. In an embodiment, the hardware and software environment illustrated in FIG. 10 may provide an exemplary platform for implementation of the software and/or methods according to the present disclosure.

Referring to FIG. 10, a networked system 800 may include, but is not limited to, computer 805, network 810, remote computer 815, web server 820, cloud storage server 825 and computer server 830. In some embodiments, multiple instances of one or more of the functional blocks illustrated in FIG. 10 may be employed.

Additional detail of computer 805 is shown in FIG. 10. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like. Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Circuitry as used in the present application can be defined as one or more of the following: an electronic component (such as a semiconductor device), multiple electronic components that are directly connected to one another or interconnected via electronic communications, a computer, a network of computer devices, a remote computer, a web server, a cloud storage server, a computer server. For example, each of the one or more of the computer, the remote computer, the web server, the cloud storage server, and the computer server can be encompassed by or may include the circuitry as a component(s) thereof. In some embodiments, multiple instances of one or more of these components may be employed, wherein each of the multiple instances of the one or more of these components are also encompassed by or include circuitry. In some embodiments, the circuitry represented by the networked system may include a serverless computing system corresponding to a virtualized set of hardware resources. The circuitry represented by the computer may be a personal computer (PC), a desktop computer, a laptop computer, a tablet computer, a netbook computer, a personal digital assistant (PDA), a smart phone, or any other programmable electronic device capable of communicating with other devices on the network. The circuitry may be a general purpose computer, special purpose computer, or other programmable apparatus as described herein that includes one or more processors. Each processor may be one or more single or multi-chip microprocessors. Processors are considered processing circuitry or circuitry as they include transistors and other circuitry therein. The circuitry may implement the systems and methods described in this disclosure based on computer-readable program instructions provided to the one or more processors (and/or one or more cores within a processor) of one or more of the general purpose computer, special purpose computer, or other programmable apparatus described herein to produce a machine, such that the instructions, which execute via the one or more processors of the programmable apparatus that is encompassed by or includes the circuitry, create a system for implementing the functions specified in the flow diagrams and block diagrams in the present disclosure. Alternatively, the circuitry may be a preprogrammed structure, such as a programmable logic device, application specific integrated circuit, or the like, and is/are considered circuitry regardless if used in isolation or in combination with other circuitry that is programmable, or preprogrammed. All of the units and devices as described above, including the units and devices shown, for example, in FIGS. 1, 7, and 9, can be implemented using circuitry.

Obviously, numerous modifications and variations of the present disclosure are possible in light of the above teachings. It is therefore to be understood that within the scope of the appended claims, the disclosure may be practiced otherwise than as specifically described herein.

REFERENCE SIGNS LIST 1A, 1B RADAR DEVICE
2 TRANSMITTER
21 SIGNAL GENERATION UNIT
22 PHASE SHIFTER
3 RECEIVER
31 IF SIGNAL CALCULATION UNIT
32 DBF SIGNAL CALCULATION UNIT
33 DISTANCE ESTIMATION UNIT
34 ANGLE ESTIMATION UNIT
35 POSITION CALCULATION UNIT
41 VEHICLE
42, 43 OBSTACLE
51 POSITION DETECTION DEVICE
52 TARGET
Tx TRANSMISSION ANTENNA
Tx1, Tx2, Tx3, Tx4 TRANSMISSION ANTENNA ELEMENT
Rx RECEPTION ANTENNA
Rx1, Rx2 RECEPTION ANTENNA ELEMENT

The invention claimed is:

1. A radar device, comprising:
a transmission antenna including three or more transmission antenna elements arranged in a straight line at equal intervals of a wavelength of a transmission wave, each transmission antenna element configured to transmit a transmission signal;
a reception antenna including an integer multiple of two reception antenna elements arranged in a straight line at equal intervals separated by a distance obtained by multiplying a value determined by subtracting three from twice a number of the transmission antenna elements and a value of half the wavelength, each reception antenna element configured to receive a reception signal; and
circuitry configured to form a plurality of virtual transmission antenna elements at respective centers of pairs of the transmission antenna elements by performing beam-forming between the transmission antenna elements in each pair, and generate virtual reception antenna elements between the reception antenna elements that are a product of the plurality of virtual transmission antenna elements and the reception antenna elements.

2. The radar device according to claim 1,
wherein, in a straight line separated in a vertical direction from and being parallel to the straight line in which the reception antenna elements are arranged at equal intervals separated by the distance, reception antenna elements of a same number as a number of the reception antenna elements are further arranged at equal intervals separated by the distance.

3. The radar device according to claim 1,
wherein, in a straight line separated in a vertical direction from and being parallel to the straight line on which the transmission antenna elements are arranged at equal intervals separated by the wavelength, transmission antenna elements of a same number as the number of the transmission antenna elements are further arranged at equal intervals separated by the wavelength.

4. The radar device according to claim 1,
wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

5. The radar device according to claim 1,
wherein the circuitry is further configured to generate the virtual reception antenna elements between the reception antenna elements by change of directivity of a radio wave emitted from each pair of the transmission antenna elements to perform analog beam-forming and to control a phase of the transmission signal.

6. The radar device according to claim 2,
wherein, in a straight line separated in a vertical direction from and being parallel to the straight line on which the transmission antenna elements are arranged at equal intervals separated by the wavelength, transmission antenna elements of a same number as the number of the transmission antenna elements are further arranged at equal intervals separated by the wavelength.

7. The radar device according to claim 2,
wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

8. The radar device according to claim 2,
wherein the circuitry is further configured to generate the virtual reception antenna elements between the reception antenna elements by change of directivity of a wave emitted from each pair of the transmission antenna elements to perform analog beam-forming and to control a phase of the transmission signal.

9. The radar device according to claim 3,
wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

10. The radar device according to claim 3,
wherein the circuitry is further configured to generate the virtual reception antenna elements between the reception antenna elements by change of directivity of a radio wave emitted from each pair of the transmission antenna elements to perform analog beam-forming and to control a phase of the transmission signal.

11. A vehicle, comprising:
the radar device according to claim 1.

12. A position detection device configured to detect a target position by execution of beam-forming on a radio wave emitted from the transmission antenna of the radar device according to claim 1 so as to scan in all directions and by detection of a direction in which intensity of the reception signal received by the reception antenna increases.

13. The position detection device according to claim 12,
wherein, in a straight line separated in a vertical direction from and being parallel to the straight line on which the reception antenna elements are arranged at equal intervals separated by the distance, reception antenna elements of a same number as a number of the reception antenna elements are further arranged at equal intervals separated by the distance.

14. The position detection device according to claim 12,
wherein, in a straight line separated in a vertical direction from and being parallel to the straight line on which the transmission antenna elements are arranged at equal intervals separated by the wavelength, transmission antenna elements of a same number as the number of the transmission antenna elements are further arranged at equal intervals separated by the wavelength.

15. The position detection device according to claim 12,
wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

16. The position detection device according to claim 12,
wherein the circuitry is further configured to generate the virtual reception antenna elements between the reception antenna elements by change of directivity of a radio wave emitted from each pair of the transmission antenna elements to perform analog beam-forming and to control a phase of the transmission signal.

17. The position detection device according to claim 13,
wherein, in a straight line separated in a vertical direction from and being parallel to the straight line on which the transmission antenna elements are arranged at equal intervals separated by the wavelength, transmission antenna elements of a same number as the number of the transmission antenna elements are further arranged at equal intervals separated by the wavelength.

18. The position detection device according to claim 13,
wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

19. The position detection device according to claim 13, wherein the circuitry is further configured to generate the virtual reception antenna elements between the reception antenna elements by change of directivity of a radio wave emitted from each pair of the transmission antenna elements to perform analog beam-forming and to control a phase of the transmission signal.

20. The position detection device according to claim 14, wherein the circuitry is further configured to generate the virtual reception antenna elements between the reception antenna elements by conversion of each reception signal emitted in time division from each transmission antenna element and received by each reception antenna element into a digital signal, and by change of a combination in a pair of the converted reception signals to a combination received from each pair of the transmission antenna elements to perform digital beam-forming to control directivity of a radio wave and to control a phase of the reception signal.

* * * * *